(12) United States Patent
Chen et al.

(10) Patent No.: US 8,795,082 B2
(45) Date of Patent: Aug. 5, 2014

(54) DIRECTIONAL BEAM STEERING SYSTEM AND METHOD TO DETECT LOCATION AND MOTION

(75) Inventors: Yu Ju Chen, San Jose, CA (US);
Farshid Aryanfar, Sunnyvale, CA (US);
Carl W. Werner, Los Gatos, CA (US)

(73) Assignee: Rambus Inc., Sunnyvale, CA (US)

( * ) Notice: Subject to any disclaimer, the term of this patent is extended or adjusted under 35 U.S.C. 154(b) by 0 days.

(21) Appl. No.: 13/574,586

(22) PCT Filed: Jan. 13, 2011

(86) PCT No.: PCT/US2011/021205
§ 371 (c)(1),
(2), (4) Date: Jul. 20, 2012

(87) PCT Pub. No.: WO2011/090886
PCT Pub. Date: Jul. 28, 2011

(65) Prior Publication Data
US 2012/0289338 A1    Nov. 15, 2012

Related U.S. Application Data

(60) Provisional application No. 61/298,162, filed on Jan. 25, 2010.

(51) Int. Cl.
*A63F 13/00* (2014.01)
(52) U.S. Cl.
USPC ........ 463/39; 463/7; 463/32; 463/36; 463/37; 463/40; 463/41; 463/42; 463/43; 463/46; 463/51

(58) Field of Classification Search
USPC ......... 463/1, 7, 36–37, 39–43, 46, 32–34, 51; 342/386, 432
See application file for complete search history.

(56) References Cited

U.S. PATENT DOCUMENTS

| 3,394,374 | A | 7/1968 | Weiss | 343/100 |
|---|---|---|---|---|
| 3,480,951 | A | 11/1969 | Freedman | 343/6.8 |
| 3,500,411 | A | 3/1970 | Kiesling | 343/100 |
| 8,181,123 | B2 * | 5/2012 | Stone-Perez et al. | 715/863 |
| 2005/0200516 | A1 | 9/2005 | Brown | 342/90 |
| 2008/0261693 | A1 * | 10/2008 | Zalewski | 463/31 |
| 2008/0316103 | A1 * | 12/2008 | Rofougaran et al. | 342/386 |
| 2009/0137317 | A1 * | 5/2009 | Rofougaran | 463/39 |

(Continued)

OTHER PUBLICATIONS

PCT Search Report and Written Opinion dated Sep. 23, 2011 re PCT International Application No. PCT/US2011/021205. 10 pages.

(Continued)

*Primary Examiner* — Sunit Pandya
(74) *Attorney, Agent, or Firm* — Lance Kreisman; Peninsula Patent Group

(57) ABSTRACT

A gaming system is disclosed comprising a console unit having a processor and transceiver circuitry. The transceiver circuitry couples to the processor and includes respective receiver and transmitter circuits. A first phased array antenna interface is employed to transmit and receive directional signals in response to the processor. The system employs a mobile game controller including a second phased array antenna interface to receive and redirect the directional signals back to the first phased array antenna interface. The processor generates proximity data based at least in part on a parameter associated with the directional signals, the proximity data representing the proximity of the mobile game controller with respect to the game console unit.

28 Claims, 10 Drawing Sheets

(56) References Cited

U.S. PATENT DOCUMENTS

| | | | |
|---|---|---|---|
| 2009/0258706 A1* | 10/2009 | Rofougaran et al. | 463/39 |
| 2009/0279107 A1 | 11/2009 | Deliwala | 356/623 |
| 2011/0212702 A1* | 9/2011 | Howard et al. | 455/404.2 |
| 2013/0002489 A1* | 1/2013 | Erad et al. | 342/432 |

OTHER PUBLICATIONS

Informal Comments dated Jul. 10, 2012 in International Application No. PCT/US2011/021205. 3 pages.

* cited by examiner

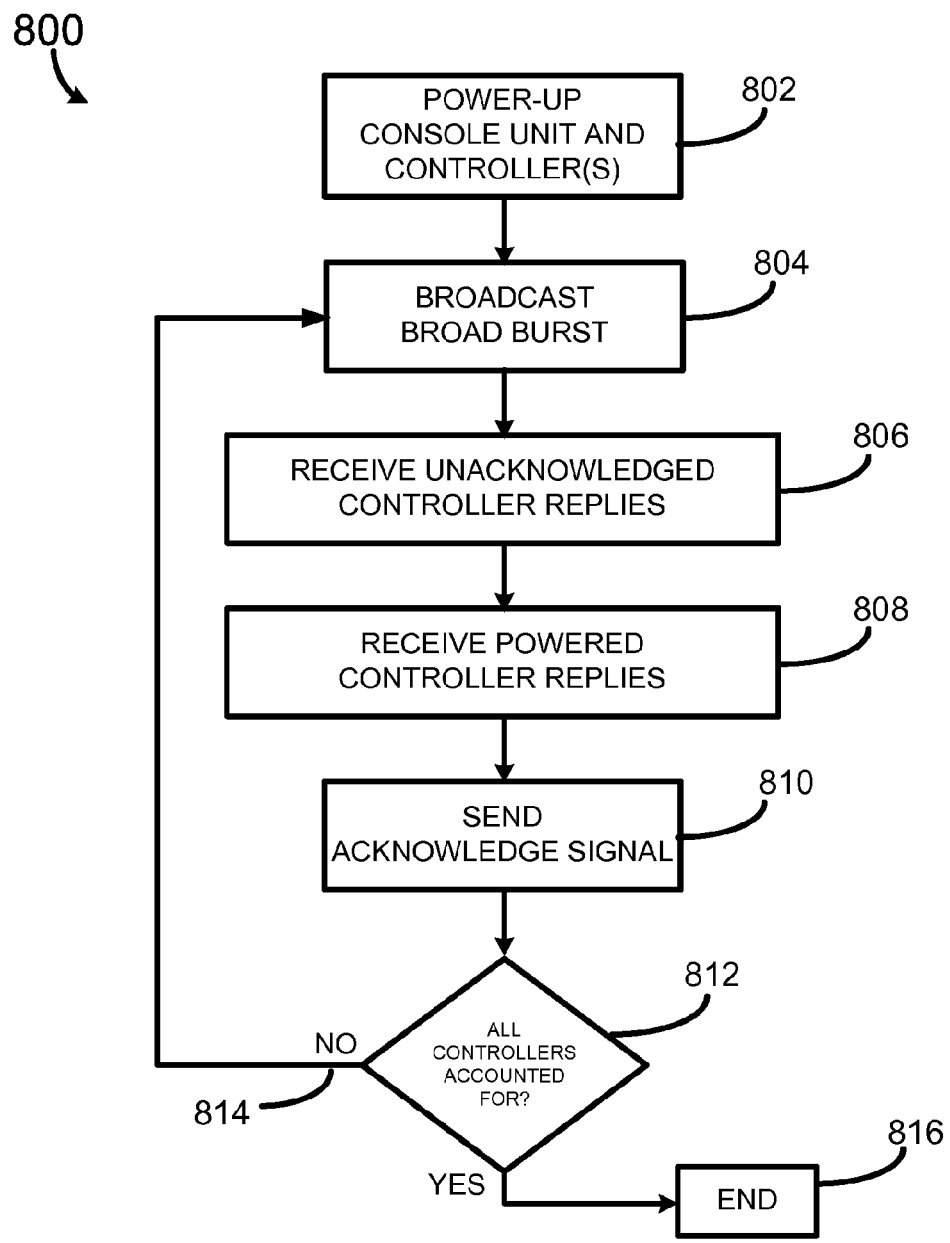

DIRECTIONAL BEAM STEERING SYSTEM AND METHOD TO DETECT LOCATION AND MOTION

CROSS-REFERENCE TO RELATED APPLICATIONS/TECHNICAL FIELD

Pursuant to 35 U.S.C. §365, this application claims priority from International Application No. PCT/US2011/021205, published as WO 2011/090886 A2 on Jul. 28, 2011, which claims priority from U.S. Provisional Application No. 61/298,162, filed Jan. 25, 2010 and entitled "DIRECTIONAL BEAM STEERING SYSTEM AND METHOD TO DETECT LOCATION AND MOTION". International Application No. PCT/US2011/021205 and U.S. Provisional Application No. 61/298,162 are hereby incorporated by reference in their entirety.

The disclosure herein relates to wireless communication systems and methods and more particularly to gaming systems that establish communication between a computing device and one or more human interface Input/Output (I/O) devices.

BACKGROUND

The symbiotic relationship between hardware and software in the gaming industry often plays a key role in a given game console's success. Cutting-edge game software often needs correspondingly advanced hardware in order to provide the highest quality gaming experience. One example of this dependency relates to tracking player movements to enhance game play. Generally, this involves providing sufficient hardware to track a player's movements via a handheld controller pad and using the data for game software to display changes in position during game play.

Conventional game controller tracking schemes generally involve two-dimensional side-to-side or up-and-down movement monitoring. These solutions generally rely on motion detection and report locations relative to a reference point. Other schemes involve complex optical systems to track player positions. While conventional position tracking schemes work well for their intended applications, the need exists for cost-effective and accurate three-dimensional tracking methods to include, for example, the proximity of a controller with respect to the console in terms of absolute location. Embodiments of such systems and methods described herein satisfy these needs.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIG. 8 illustrates detailed method steps to carry out a controller initialization procedure using the packet protocol of FIG. 7;

DETAILED DESCRIPTION

Embodiments of gaming systems and methods are described herein where three-dimensional tracking of one or more mobile game controllers with respect to a game console may be carried out by employing millimeter-wave wireless links. In one embodiment, the links are established between each controller and a game console via directional beams radiated between respective phased-array antennas. The controllers may utilize unique phased array antennas to reflect directional beams back to the game console, with beam orientation information to establish controller coordinates in three dimensions. Use of the millimeter-wave spectrum in this regard provides significant advantages in cost, complexity, and end user experience.

In one embodiment, a mobile game controller employs a phased array antenna in the form of a retro-directive array. The retro-directive array provides a low-power and low-cost automatic tracking scheme for straightforward position detection and tracking. Active or passive phase conjugation circuitry enables one embodiment of the retro-directive array to boost signaling levels for more practical bidirectional signaling.

In other embodiments, the millimeter-wave wireless links employ various uplink and downlink configurations to transfer data between one or more mobile game controllers and the game console. One uplink embodiment to establish communication from the mobile controller to the game console involves a code spreading technique to enable multiple controllers to utilize the same carrier frequency. To effect a straightforward downlink, in one embodiment a frequency shift keying modulation method may be employed.

System Overview

Figure 1:
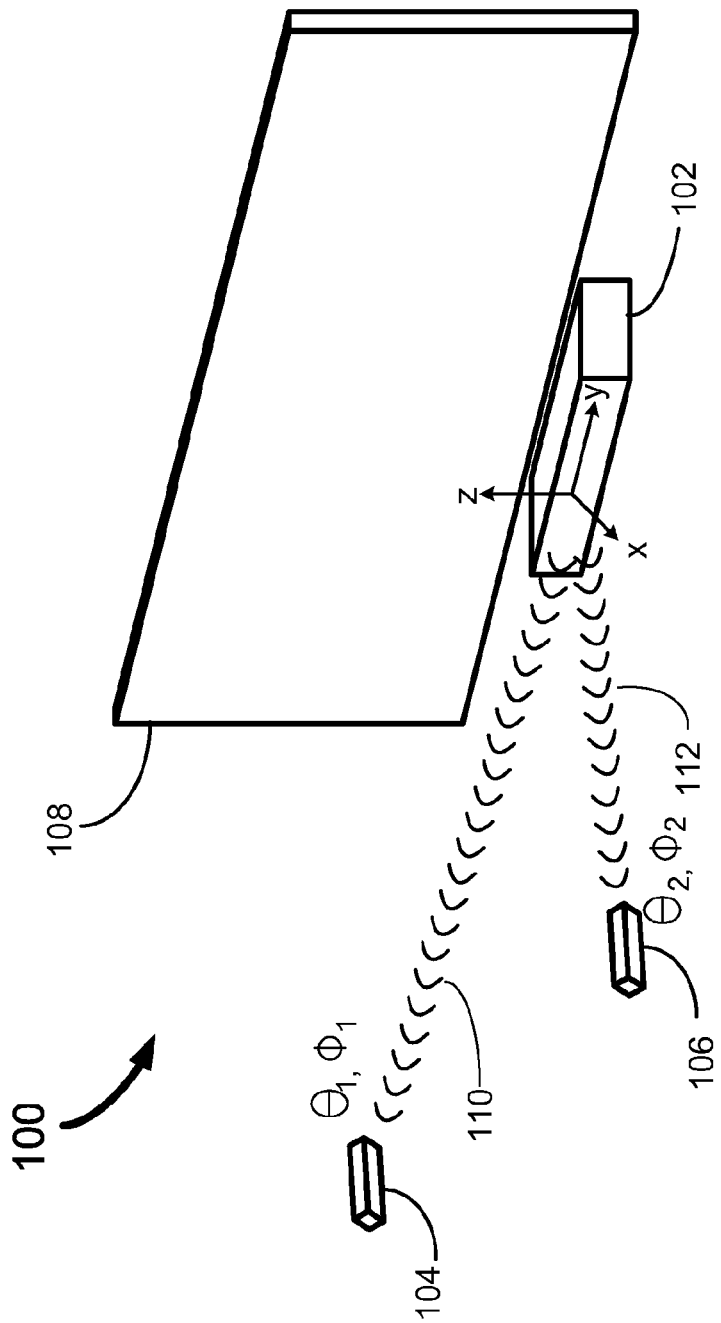
FIG. 1 illustrates a side perspective view of one embodiment of a game console system.

Referring now to FIG. 1, one embodiment of a game console system, generally designated 100, includes a console unit 102 that communicates with mobile game controllers 104 and 106. The game controllers 104 and 106 are typically worn, held and/or manipulated by respective players to control virtual characters or objects on a video display 108 such as an interconnected computer monitor or television. Millimeter-wave wireless links 110 and 112 established between the console unit 102 and the controllers 104 and 106 respectively enable the system 100 to track player movements in three dimensions x, y, and z from the perspective of the console 102. The φ and θ dimensions correspond to side-to-side and up-down movements, respectively, while the R dimension corresponds to proximity movements. A game embodied in software (not shown) running on the console 102 uses the positional information generated by the controllers 104 and 106 (which is updated in real time) to visually present corresponding movement on the display 108. As players progress through their gaming activity, the three-dimensional tracking feature heightens player involvement by rendering a more life-like three-dimensional video game experience. An embodiment of a controller is described further with reference to FIG. 4.

As more fully described below with respect to FIG. 6, the wireless links 110 and 112 generally establish one or more communication paths between the controllers 104, 106 and the console unit 102. An uplink configuration facilitates data transfer from the controllers 104 and 106 to the console 102, while a downlink configuration allows for data transfer from the console 102 to the controllers 104 and 106.

Using millimeter-wave signals for the game console system 100 described herein provides for relatively high antenna gain in dimensions on the millimeter scale. Millimeter-wave signals are broadly defined as signals in the 30 GHz-300 GHz range. The short wavelength allows very fine angular resolution for position detection and tracking. Moreover, from a regulatory perspective, a wide unlicensed bandwidth on the order of 7 GHz (centered at 60 GHz) is conveniently available for game play. Using this spectrum a range resolution on the order of around 1.7 inches is achievable using straightforward Fast Fourier Transform (FFT). Signaling techniques such as CHIRP can be used to further improve the resolution. Further advantages with millimeter-wave signaling involve, for example, low multi-path effects, efficient post-processing schemes and robust detection methods.

Game Console Unit

The game console unit 102 described herein generally comprises an interactive entertainment computer or electronic device that produces a video display signal. The display signal may be used with a display device 108 (FIG. 1), such as a television or monitor, to display a video game. While the console unit 102 is often designed primarily for playing video games, it may also include general purpose computer functionality for carrying out other tasks, such as web browsing, photo management, and email, to name but a few. The key to the game console unit 102 described herein is that it provides any gaming or computer-related environment where a mobile controller device (e.g., controllers 104 and 106) is disposed remotely from a paired console unit (e.g., console unit 102). An embodiment of the game console unit 102 is described further with reference to FIG. 2.

Figure 2:
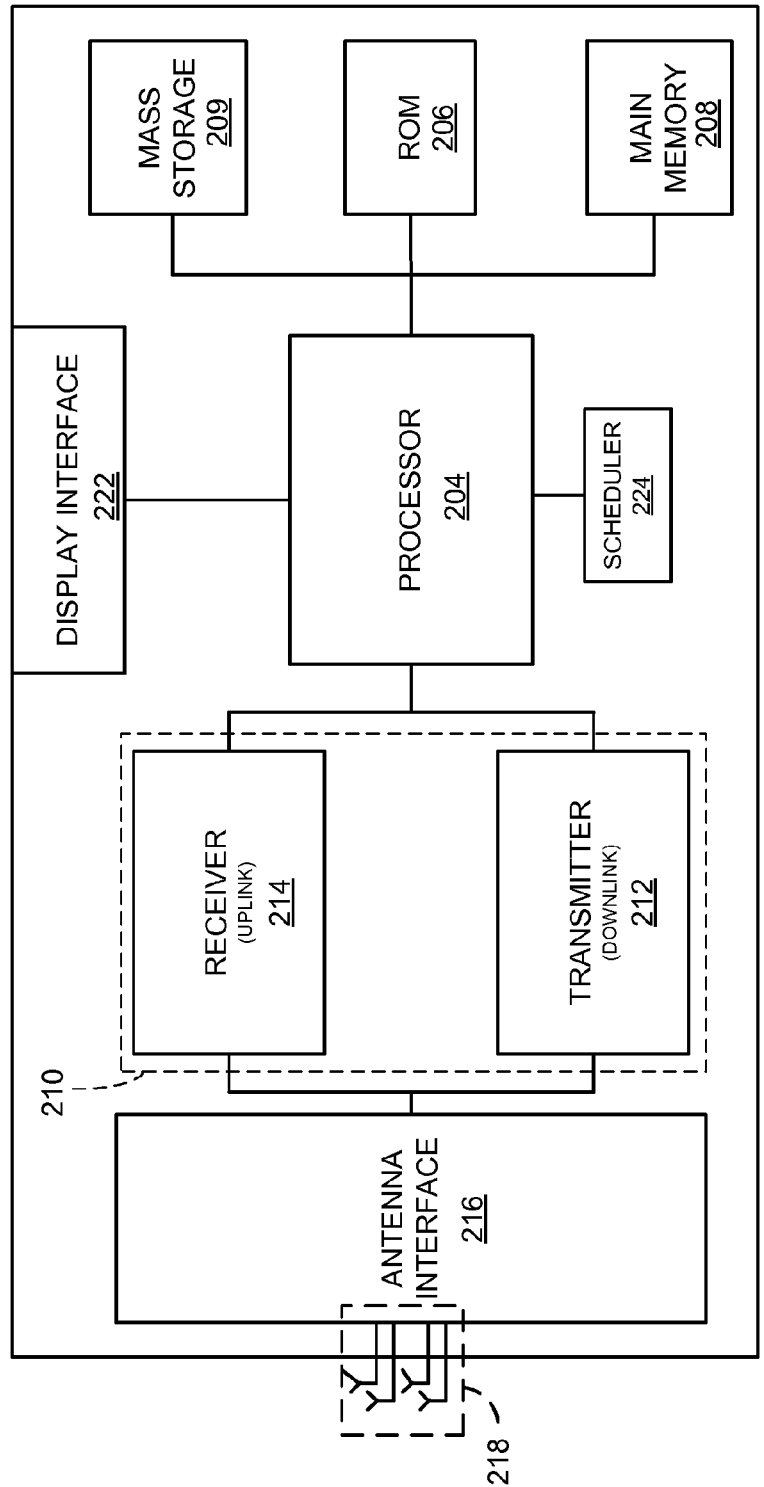
FIG. 2 illustrates a block diagram of one embodiment of the electronic resources within the game console unit of FIG. 1.

With reference now to FIG. 2, one embodiment of a game console unit, generally designated 200, includes computer processing resources in the form of a processor such as a central processing unit (CPU) 204 and/or graphics processor unit (GPU) (not shown). The processor 204 carries out compute-intensive tasks in response to software loaded into a main memory 208, e.g., via a mass storage access unit 206 such as a read-only-memory (ROM) drive for receiving media, such as DVD or Blu-Ray media. High-performance general purpose processors or multi-core processors may be employed to provide sufficient processing power. The processor resources may reside inside a console housing (not shown), or at a remote location to interface with the game system 100 via a network interface (not shown). The console main memory 208 may take the form of a graphics DRAM architecture to interface with the processor 204 to store in-process computing results such as shadings and triangle formations for game frames during operation. Further mass storage 209, e.g., in the form of one or more hard drives may be employed to store often-used game software and related files.

Further referring to FIG. 2, to establish wireless links with one or more of the mobile controllers 104 and 106, the processor 204 interfaces with one or more wireless transceiver circuits 210 (in phantom). Each transceiver circuit 210 employs transmission circuitry 212 as part of a downlink to communicate with the controllers 104 and 106, and receiver circuitry 214 forming the receiving end of an uplink. Each of the transmitter and receiver circuits are described in further detail below. The transceiver circuit 210 couples to a directional antenna interface 216 that couples to a directional antenna 218. One embodiment of a directional antenna 218 involves a two-dimensional array of antenna elements defining a phased array antenna, more fully described below with reference to FIG. 3. Unlike omni-directional antennas that have a uniform gain in all directions, a directional antenna has a different antenna gain in each direction.

With continued reference to FIG. 2, the game console unit 200 detects and calculates positional data associated with one or more controllers 104 and 106 in accordance with methods described below. Position information is received from the controllers 104 and 106 in the form of angle of arrival (AOA) and time of arrival (TOA) signal components and fed to the processor 204 where actual position data is calculated and processed. The processor 204 then drives a display port or interface 222. A display device 108, such as a monitor or television, coupled to the display interface 222, visually communicates the calculated positional data on the monitor or display 108 via character or object movements corresponding to the controller movements. For high-definition viewing, a suitable wired or wireless HDMI interface (not shown) is employed as the display interface to ensure a suitable data rate. Communications between multiple game controllers 104 and 106 and the console 200 may be channelized and arbitrated by a packet scheduler 224, which prevents collisions and/or conflicts between data transfers among the various controllers 104 and 106 and the console 200.

Game Console Antenna

Figure 3:
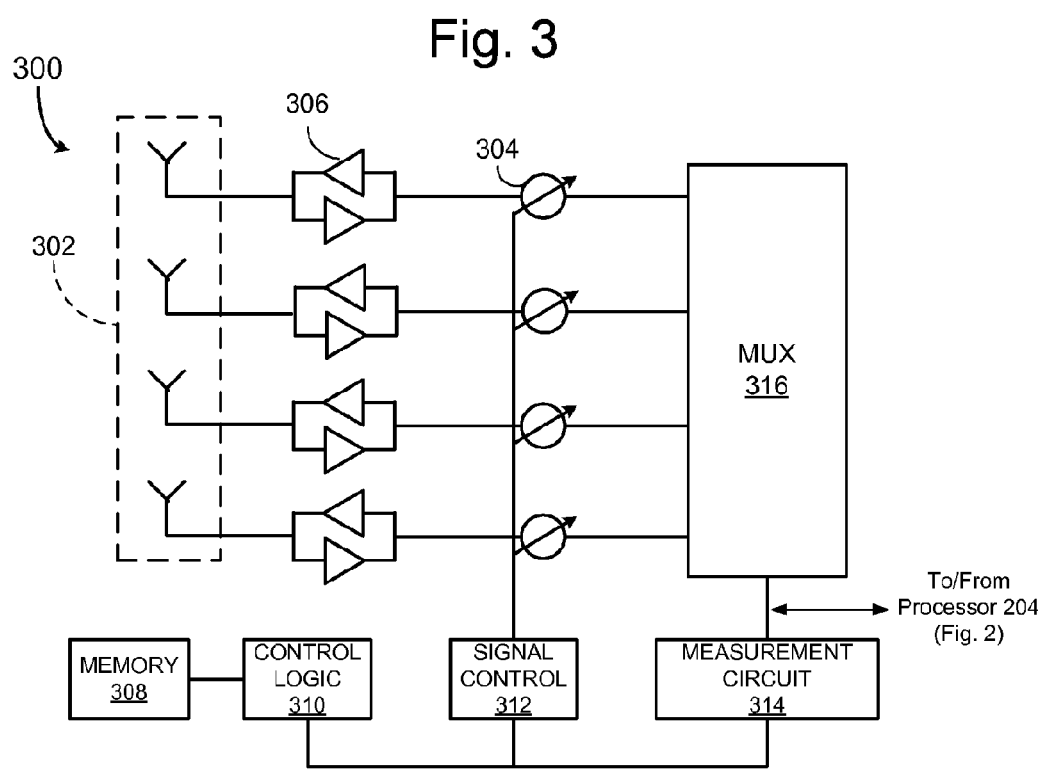
FIG. 3 illustrates a block diagram of one embodiment of the phased array antenna transceiver circuitry employed in the game console unit of FIG. 2.

Referring now to FIG. 3, one embodiment of a phased array antenna circuit, generally designated 300, for use at the console unit 200 (FIG. 2) includes a plurality of antenna elements 302, such as micro-stripline components arranged in a two-dimensional array. The elements may be configured to, for example, output and/or receive signals in a 7 GHz frequency band centered on 60 GHz (or on a frequency between 30 and 300 GHz). Antenna power is controlled by respective power amplifiers 306 having variable or fixed gains to amplify signals between the antenna elements and corresponding phase adjustors 304. While the entire phased array antenna circuit 300 may be monolithically formed on an integrated circuit chip, the antenna array 302 may be disposed external to the phased array antenna circuit 300, formed on-chip, on a chip package or chip carrier, and/or on another integrated circuit (for example, in a chip stack). The phase adjusters 304 correspond to the plurality of antenna elements to set the relative phases of the transmit or receive signals for the different antenna elements based on coefficients stored in a memory 308 (such as a look-up table). The phase adjustors 304 act in a coordinated fashion in response to control logic 310 and signal control circuitry 312 (both of which may be realized by the processor 204) to effectively steer the orientation of signal transmission by assigning a different phase angle offset to signals transmitted or received by each antenna element 302.

The phased array antenna 300 geometry plays an important role in antenna detection and tracking. One of the key parameters in antenna design involves directivity. Directivity is a measure of beam strength in a given directional orientation Generally, the directivity D for a linear array of antennas radiating into half-space may be expressed as an approximation by the equation:

$$D_{array\_factor} \approx 4\left(1 + \frac{L}{d}\right)\frac{d}{\lambda}; L \gg d \Longrightarrow D_{array\_factor} \approx 4\frac{L}{\lambda}$$

where d=antenna spacing, λ=wavelength, and L=array length. Further, the respective vertical and horizontal 3 dB beamwidths $\theta_V$ and $\phi_H$ for a uniform broadside array may be approximated by the relationship:

$$\theta \cong \cos^{-1}\left(\frac{\pm 1.391\lambda}{\pi N d}\right) \cong \frac{101.5}{D}$$

Thus, by appropriately sizing the array dimensions, a desired directivity may be achieved. Note that the 3 dB beamwidth may be defined generally as twice the angle on either side of the main beam where the power falls by at least half. One example of an array in accordance with the disclosure herein employs 100 antenna elements arranged in a 20 by 5 matrix with relative spacing on the order of 5 mm.

Further referring to FIG. 3, during antenna reception, electrical signals acted on by the phase adjustors 304 are fed to a measurement circuit 314. The circuit determines whether a metric associated with a received signal, such as a channel quality index parameter, power level parameter, or the like, exceeds a corresponding threshold. This is particularly useful during an initial location detection procedure, more fully described below. In some embodiments, an optional multiplexer 316 selectively couples one or more received electrical signals associated with one or more antenna elements to the measurement circuit and/or the processor 204, to effect time-multiplexed operation. Alternatively, the different antenna elements may be associated with different frequency bands to effect frequency multiplexed operation.

Depending on the embodiment, the console unit antenna interface 300 may be designed to time-share transmission and detection functions, or provide dedicated transmission and detection functions. Time-sharing a given phased array between transmission and reception may be carried out in a straightforward manner by implementing an optional switching unit (not shown) controlled by the control logic 310. Dedicated transmission and reception functionality may be accomplished by adding additional antenna resources as the need dictates.

Mobile Game Controller

Figure 4:
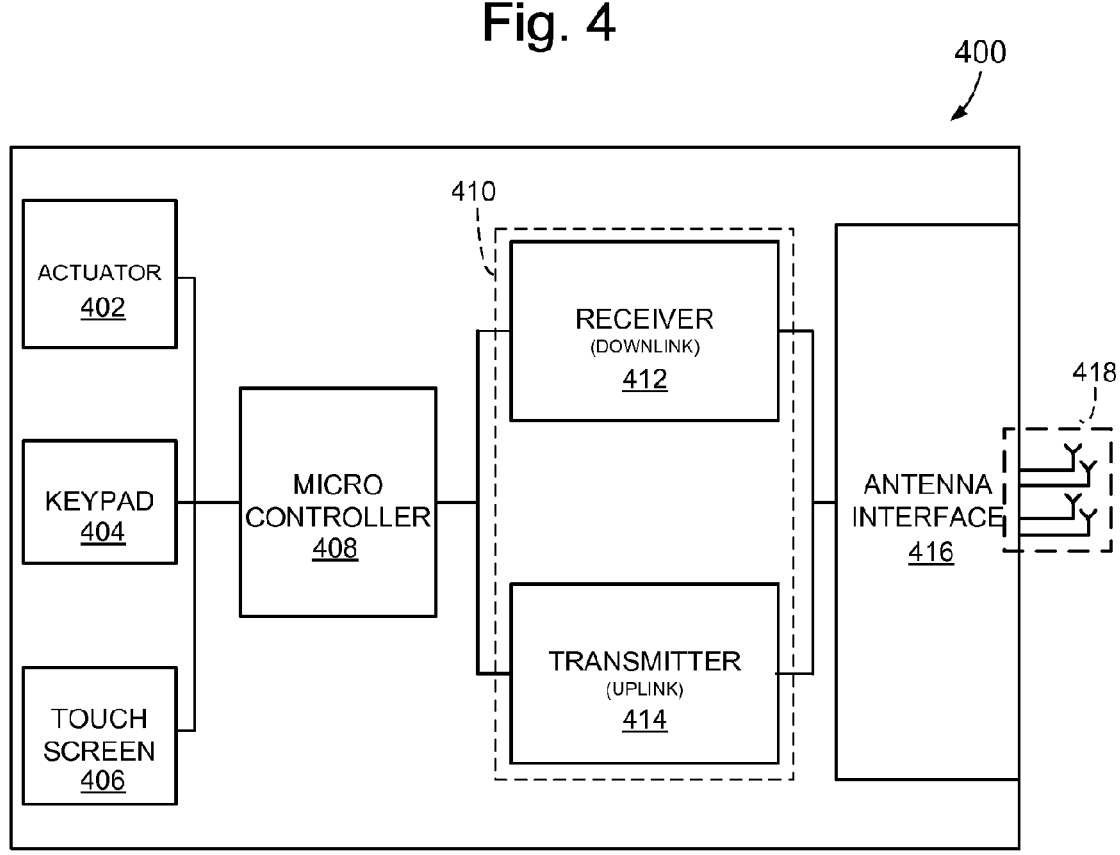
FIG. 4 illustrates a block diagram of one embodiment of the circuitry within one of the game controllers of FIG. 1.

FIG. 4 illustrates one embodiment of a mobile game controller 400, corresponding to the controllers 104 and 106 shown in FIG. 1, to communicate with a game console unit 200 (FIG. 2). The controller 400 may be ergonomically crafted to fit in a player's hands or configured for placement on the player's body via straps or attachable apparel, or for placement on an object associated with the game. To provide for typical gaming functions, the controller may incorporate optional gaming signal generators such as an actuator 402 and/or mini joystick or the like, and a keypad 404. A touch screen 406 may be employed for added functionality.

With continued reference to FIG. 4, an optional microcontroller 408 manages the flow of data from the signal generators (e.g., actuator 402, keypad 404 and touch screen 406) and controls transceiver circuitry 410 (in phantom). The transceiver circuitry 410 employs a receiver circuit 412 that provides the reception end of a downlink 606 (FIG. 6), while a transmitter circuit 414 provides the transmission side of an uplink 608 (FIG. 6). The transceiver circuitry 410 communicates with the console unit (e.g., console unit 200) via a unique antenna interface 416 that employs a phased array antenna 418. As more fully described below, the controller antenna 418 cooperates with the console antenna (e.g., console antenna 302) to enable the console unit (e.g., console unit 200) to detect and track the controller position during game play.

Figure 5:
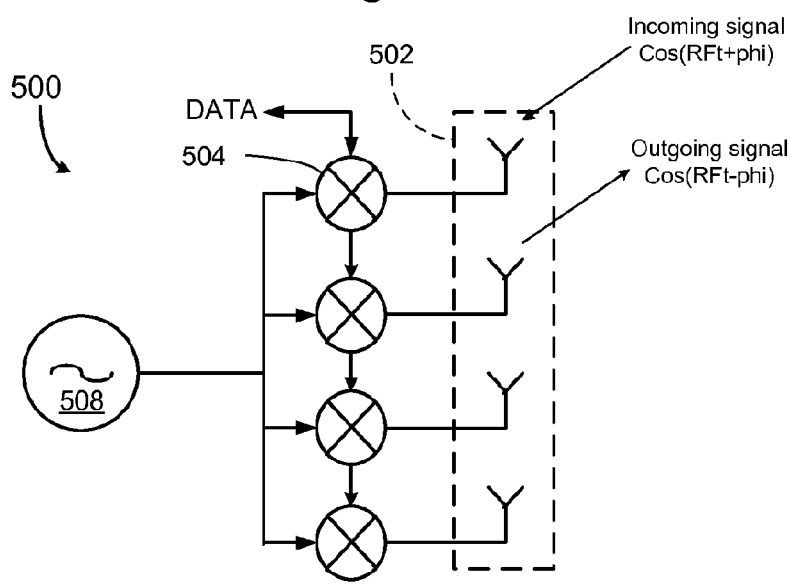
FIG. 5 illustrates a block diagram of one embodiment of a retro-directive antenna array employed in the game controller of FIG. 4.

Referring now to FIG. 5, one embodiment of the mobile controller 400 (FIG. 4) to enable position detection and tracking includes a special form of phased array antenna known as a retro-directive array, generally designated 500. One form of the retro-directive array includes a two-dimensional array of antenna elements 502 configured similar to that of the console antenna 300 (FIG. 3), with a geometric layout optimized for a desired directivity parameter. Unlike the fully steerable console antenna, however, the retro-directive array employs active phase conjugation circuitry in the form of respective mixers 504 that each tie-in to a local oscillator 508. Like the console antenna, signals received at each antenna element are offset by a specified phase that cooperatively steers transmission or reception of a beam. By setting the local oscillator frequency to twice the incoming RF carrier frequency, the antenna reflects an incoming signal back to the signal source in accordance with the following approximations:

$$V_{out} = V_{in}\cos(\omega_{RF}t + n\phi) \times V_{LO}\cos(2\omega_{RF}t) =$$
$$\frac{1}{2}V_{in}V_{LO}\cos(\omega_{RF}t - n\phi) + \frac{1}{2}V_{in}V_{LO}\cos(3\omega_{RF}t + n\phi)$$

The second component of the expanded equation may be discarded using filtering since it's center frequency is a harmonic of the leading component center frequency. The result is an automatic phase conjugation of the incoming signal that essentially redirects the incoming signal back from where it originated.

Use of the retro-directive array 500 by a mobile game controller 400 to communicate with the game console unit 200 allows the controller 400 to utilize minimal power. This is achievable since actively steering the reflected signals by specialized control circuitry is unnecessary. Moreover, the active nature of the phase conjugation circuitry provides a signal boosting effect for the reflected signals as they propagate back to the console unit. Further, the controller may resort to using purely analog circuitry, if desired, to avoid digital baseband processing circuitry. Other embodiments may utilize different phase conjugation methods that passively reflect incoming signals, such as corner arrays or Van Atta arrays. Those configurations are well-known to those skilled in the art and warrant no further description herein.

While a retro-directive array provides distinct advantages for one or more low-power mobile controllers, some embodiments may opt for one or more fully steerable phased array antennas. This would enable the controllers to search for and detect the console position. Moreover, positioning the antenna structures may involve mounting the array flush with the controller body or nested within an opening to maximize line of sight operability.

Game System Downlink

In most wireless digital data communications systems, digital data symbols are generally modulated onto an analog radio frequency (RF) carrier signal ω. The carrier signal is transmitted and received via antenna structures. The received signal is then demodulated as an analog signal and compared to a threshold value to determine the data bit value (known as slicing) and sampled to recover the transmitted digital data.

Figure 6:
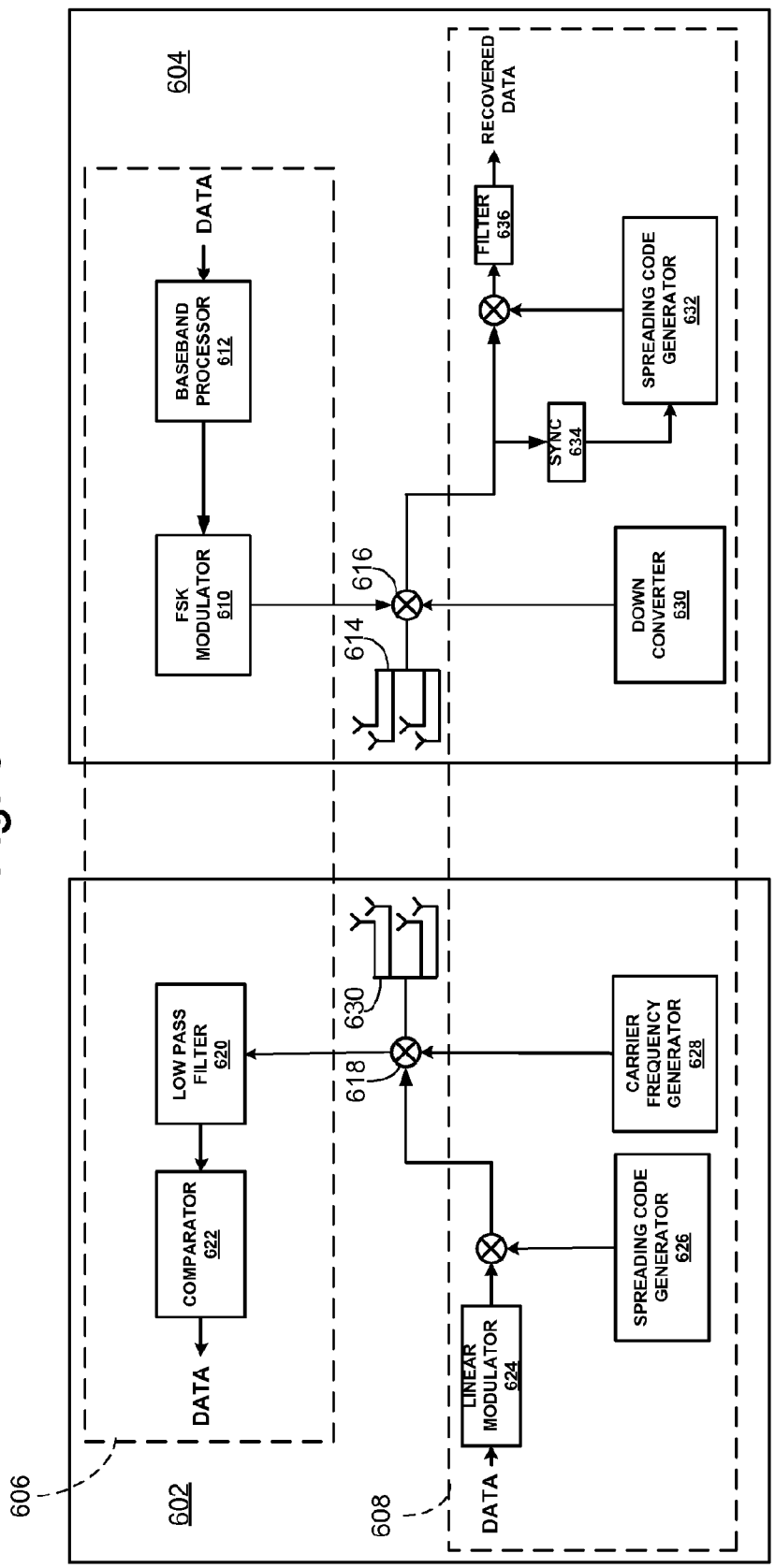
FIG. 6 illustrates a block diagram of one embodiment of a game console unit paired with a controller to establish respective uplink and downlink communication paths.

FIG. 6 illustrates respective uplink and downlink configurations involving a game console unit 604 paired with one mobile controller 602. In one embodiment, described more fully below, different signaling circuits and methods are used to realize respective uplink and downlink paths 606 and 608 (in phantom). With continued reference generally to FIG. 2, and more particularly to FIG. 6, the console transmitter circuitry 212 forms part of the system downlink 606 for transmitting data and/or control information from the game console unit to the controller(s). Data exchanged in this direction may, during controller initialization, assign a temporary address or designation to a controller 602; or may involve, for example, physical feedback data for processing at the controller to provide an added sensory experience to game play.

In an effort to minimize power and complexity, a constant envelope form of modulation may be used for the downlink radio. Frequency shift keying (FSK), amplitude shift keying (ASK), or binary phase shift keying (BPSK) modulation are a few schemes that work well in this regard. Shift keying modulation generally involves transmitting digital information through discrete changes in the carrier wave frequency (FSK modulation), amplitude (ASK modulation) or phase (PSK modulation). In one particular embodiment, modulation circuitry in the form of an FSK modulator 610 is employed to convert a digitized baseband signal from a baseband processor 612 to a suitable RF-modulated signal. The RF signal is then fed to a phased array antenna 614 via mixer array 616 for directed wireless transmission to the controller 602.

At the controller side of the downlink 606, one embodiment of the receiver circuitry takes the form of a straightforward array of intermediate frequency (IF) mixers 618 to downconvert the RF signal, and pass it to a low-pass filter 620 for baseband demodulation. A slicing threshold comparator 622 determines whether demodulated symbols are "0"s or "1"s for data recovery. The data may then be fed to the controller microcontroller 408 to process the data into, for example, feedback data for input to vibration transducers (not shown). Other receiver configurations are possible as the application dictates.

Game System Uplink

With the downlink 606 providing data from the console 604 to the controller 602, the uplink 608 enables multiple mobile controllers to utilize the same carrier frequency in transmitting data to the game console unit. In one embodiment, the uplink is based on a code spreading scheme where information bits are spread over an artificially broadened bandwidth. The bits are then multiplied with a pseudorandom bit stream running several times as fast. The bits in the pseudorandom bit stream are referred to as "chips", with the streaming known as "chipping" or spreading code. It increases the bit-rate of the signal (and the amount of bandwidth it occupies) by a ratio known as the spreading factor (the ratio of the chip rate to the original information rate). This is a form of code-division-multiple-access (CDMA) signaling.

To carry out the code spreading method, the controller 602 employs a linear modulator 624 to modulate input data according to, for example, an FSK, ASK, or PSK modulation technique. The modulated data is then grouped into codewords, one for each symbol transmitted. The codewords are generated by a spreading code generator 626 and may be mapped in a variety of ways, such as for example by frequency or phase values. In one specific embodiment, a given codeword is inverted if the symbol is a "0", and left unchanged if the symbol is a "1". The controller code "chips" are then multiplied with a carrier waveform generated by an upconverting carrier frequency generator, such as a local oscillator 628. Optional amplification and bandpass filtering may be employed as necessary. The RF signal may then be transmitted by the controller phased array antenna 630 to the game console unit 604.

At the game console receiving end of the uplink 608, the receiver circuitry 214 (FIG. 2) employs correlation receivers to store exact copies of the system's chipping codes for each controller. The receiver circuitry uses the codes to multiply a received data stream selecting the same chipping code as was used in each controller, thereby de-spreading the coded signal. This generally involves an appropriate downconverting module 630 to demodulate the coded data components from the RF signal, and a de-spreading circuit including a spreading code generator 632 and synchronizer circuit 634. The original user data is restored by mathematical operations, such as by filter 636, as necessary.

As noted above, the code spreading scheme allows multiple controllers to communicate with the console over the same carrier frequency. In essence, multiple channels for the system may be realized in an efficient manner.

While a code-division form of channel access is described above, it should be understood that other ways of channelizing the system may be employed. For example, assigning discrete frequency bands in a frequency division scheme may be suitable in some applications. Similarly, time division methods may alternatively be applied. In fact, in accordance with one embodiment of a packet signaling protocol more fully described below, a version of a time-multiplexed signaling scheme is employed in concert with the code-spreading uplink described above.

System Operation

Figure 7:
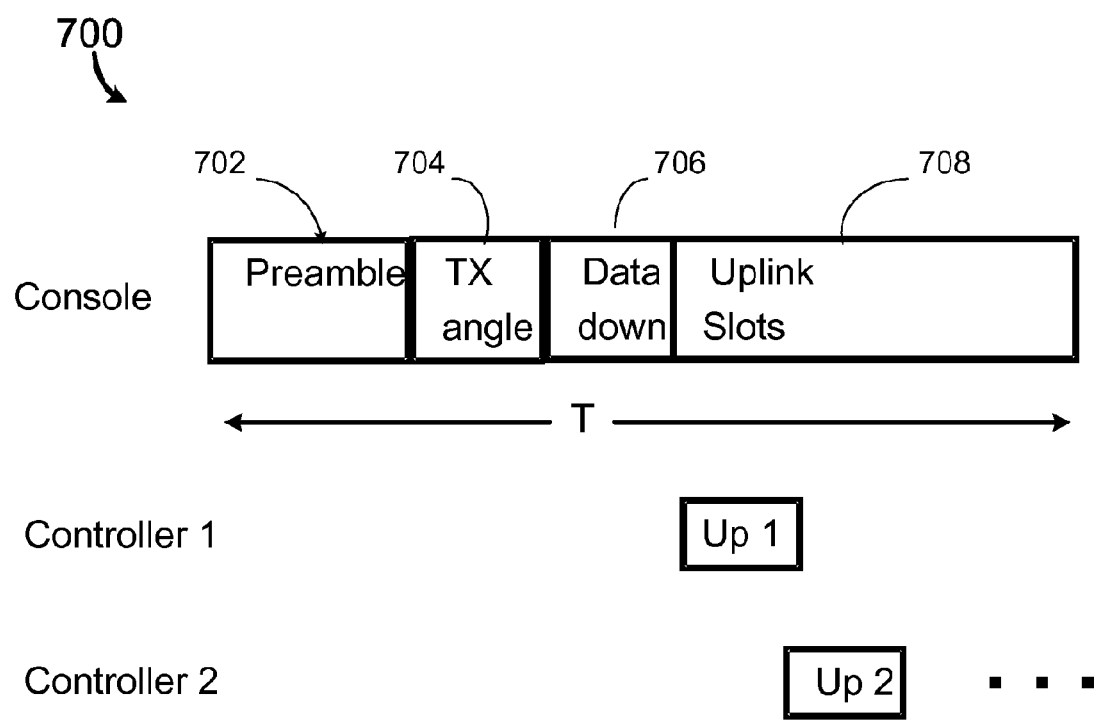
FIG. 7 illustrates one embodiment of a packet protocol for carrying out data transfers between the game console and one or more game controllers.

To manage uplink and downlink data transmission traffic, in one embodiment, the system 100 employs a unique packet protocol controlled by the console scheduler 218 (FIG. 2). FIG. 7 illustrates a packet structure, generally designated 700, for transmission by the console transmission circuitry 212 over a predefined carrier frequency ω. The packet structure includes a preamble frame 702 to establish a given packet transfer, followed by a beam orientation frame 704. The beam orientation frame includes the vertical and horizontal angle information for the initially transmitted beam so that, upon reflection back to the console from the controller, the console can identify the controller location by the orientation frame. A data downlink time slot 706 is provided for data from the console to the controller, such as initialized uplink assignments or physical feedback data, as described below. A relatively long uplink frame 708 is provided for uplink data slots to allow multiple controller transmitters to sequentially transmit data (modulated on the reflected beams) to the console in accordance with their respective slot assignments. Although shown as time interleaved in FIG. 7, the uplink slots may be code-division multiplexed and separately received by several rake receivers in the console.

In operation, before the uplinks and downlinks carry out gaming-related transactions, the gaming system 100 (FIG. 1) carries out a variety of preliminary tasks. This generally involves initializing one or more controllers via a controller initialization procedure 800 (FIG. 8) at startup (and/or during game play when an additional player wishes to join, described further with reference to FIG. 8), followed by a search sequence 1000 (FIG. 10) to identify the absolute locations of one or more controllers in three-dimensional space. The initialization routines are followed by ongoing tracking steps that update the controller positions on a periodic or continuous basis, depending on the application needs (described further with reference to FIG. 10).

With reference now to FIG. 8, the controller initialization procedure 800 in further detail begins by first powering up the console unit 102 (FIG. 1) and one or more of the controllers 104, 106 by one or more players, at 802. The console unit transmitter circuitry 212 (FIG. 2) then transmits a directional signal over the downlink 606, at 804, in accordance with the packet protocol described above, and awaits controller replies. The blank or unmodulated carrier frame intervals for the packet uplink slots allow the powered controllers to modulate the reflected carrier signal to create respective uplink data. In some embodiments, to avoid collisions, unacknowledged controllers reply by responding after a wait interval, which may be predetermined or random, at 806. Powered controller transmitters then reply during the blank or unmodulated carrier frame intervals by modulating the reflected carrier signal to broadcast one or more data signals such as an enable bit to the console over the uplink 608, at 808. Since, in one embodiment, each controller employs a unique code mixed with the data bit(s), the game console receivers may decode the controller code to identify each unique controller. In response to receiving the powered controller reply, the console transmitters send an acknowledge signal to the controller receivers, at 810. The acknowledge signal may include an address or designated controller number (such as 1, 2, 3, or 4 for systems employing four controllers) so that the controller microcontroller knows the appropriate uplink slot assignment for transmitting data to the console transmitters. The assignment also informs the associated player of his/her controller number for multiplayer games. A determination is then made, at 812, to account for all controllers. If all controllers are accounted-for, the process ends, at 816. If one or more controllers remain unaccounted-for, the process may repeat, at 814 by broadcasting a new broad burst. During game play, the procedure may periodically repeat, at 814, to detect additional players.

Following the controller initialization process, the scanning/searching procedure 1000 (FIG. 10) is then initiated by the console, to detect the absolute position of at least one controller, in three dimensional space, with respect to a predetermined console reference point. The reference point may generally be thought of as a location proximate the console antenna array. One embodiment of the scanning procedure, described more fully below with respect to FIG. 10, involves sequentially steering a beam through each of the possible horizontal $\phi_H$ and vertical orientations $\theta_V$ over a localized area, such as within a room, and collecting data indicative of reflected signal strength such as a reflected signal strength indicator (RSSI) parameter for each possible orientation.

Figure 9A:
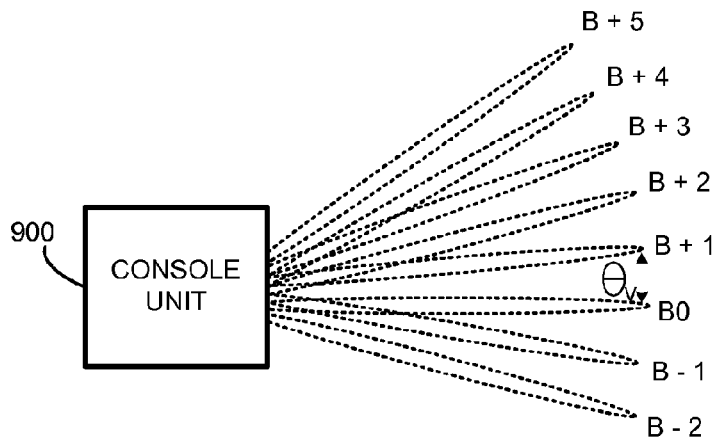
FIG. 9A illustrates a side view of a game console unit during one embodiment of a scan mode, and showing various directed beams at different vertical angles $\theta_V$.
Figure 9B:
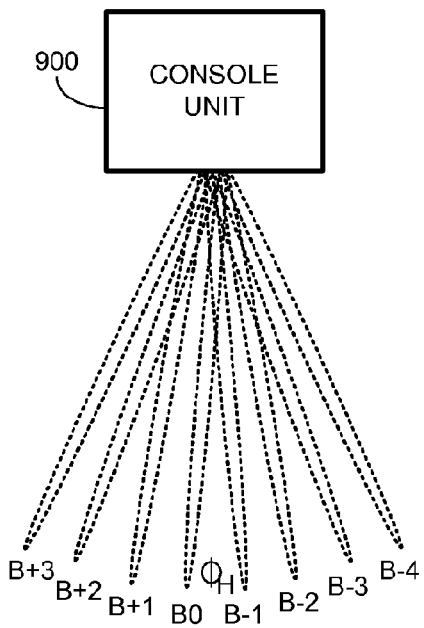
FIG. 9B shows a top plan view of a game console during one embodiment of a scan mode similar to FIG. 9A, but showing various directed beams at different horizontal angles $\phi_H$.

Before describing the detailed scanning procedure, and briefly referring to FIG. 9A, a side view of a game console unit 900 is shown with a plurality of narrow directional beams (in phantom) steered at incrementally adjusted vertical angles $\theta_V$. Each beam is labeled with respect to a reference beam B0. Beams B+1 through B+5 represent directional beams at incrementally increasing vertical angles from the reference beam B0, while beams B0−1 and B0−2 represent negatively angled beams. A similar plan view in the horizontal context is shown in FIG. 9B, with each of the steered beams being incremented by a change in horizontal angle $\phi_H$. During the actual scanning method, each beam includes information regarding its angle of orientation. Thus, upon reflection from the controller, the angle of arrival information may be deduced in a straightforward manner. In one embodiment, these angles are quantized to the resolution of a digital driver, like a digital-to-analog converter DAC (not shown) that quantizes the range into $2^N$ possible angles.

Figure 9C:
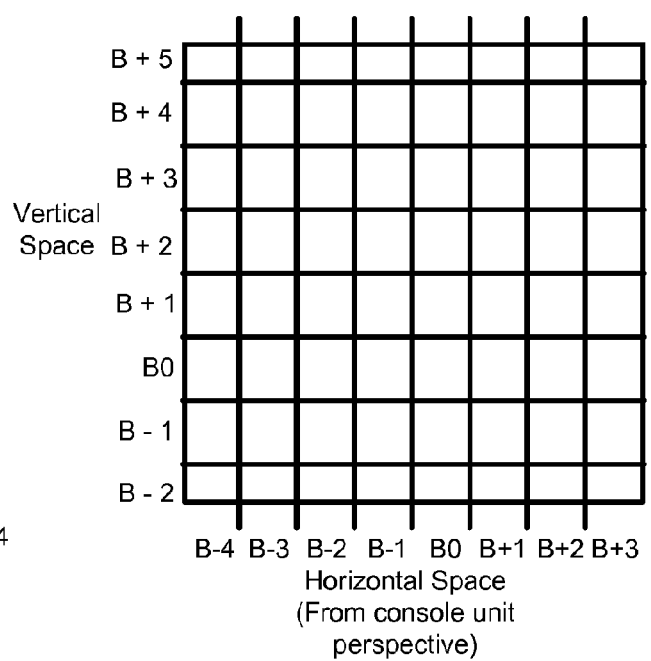
FIG. 9C illustrates one example of a signal strength matrix for use in detecting the position of the controller during scan mode.
Figure 10:
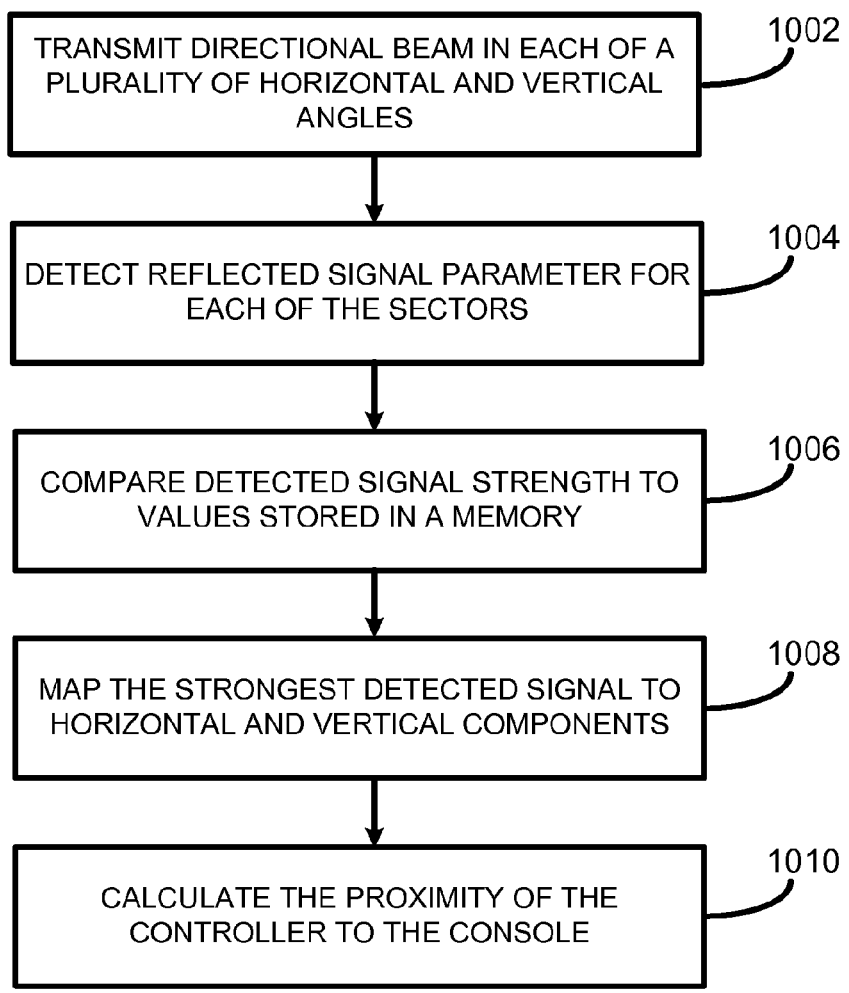
FIG. 10 illustrates detailed method steps to carry out a controller location detection procedure.

Referring now to FIG. 10, the scanning or searching procedure begins by initiating the console antenna to direct each beam at each possible horizontal and vertical orientation, at 1002, in an effort to detect and track both the vertical and horizontal positions of one or more controllers. As a given steered beam illuminates a controller, the retro-directive array 500 on the controller reflects the steered beam back to the console unit, at 1004. Since each steered beam from the console includes data indicating beam orientation in terms of the horizontal beam angle $\phi_H$, and the vertical beam angle $\theta_V$, the reflected wave carries information identifying the controller location in terms of the horizontal and vertical angles. Collected signal strength data for each possible beam orientation may be stored in memory such as that illustrated as a matrix in FIG. 9C for later retrieval.

Further referring to FIG. 10, during the search/scan procedure, the console antenna measurement circuit 308 (FIG. 3) collects data on received signal strength for each directed beam. The results for each reflected beam are then compared to values stored in the memory 302 or to a predetermined threshold level, at 1006. Controller position detection is accomplished in one embodiment by selecting the beam orientation with the highest channel quality parameter, at 1008. Variations of this basic approach are replete, and may involve broadly radiating a wide-beam into general zones, and refining the search with narrow beams once the general direction of a target controller is acquired. Other signal quality parameters may also be used to determine direction, such as bit error rate, etc.

Further referring to FIG. 10, once a reflected beam is detected, its directional coordinates in terms of $\phi_H$ and $\theta_V$ are identified, and the round trip time of flight calculated, at 1010. The round trip time of flight provides a useful parameter to identify the proximity of the controller to the console with a range resolution on the order of approximately 1-2 inches.

In one embodiment, the directed beam search procedure described above may be augmented for use as an alternative method to initialize the controllers rather than omnidirectional broadcasting.

Figure 11:
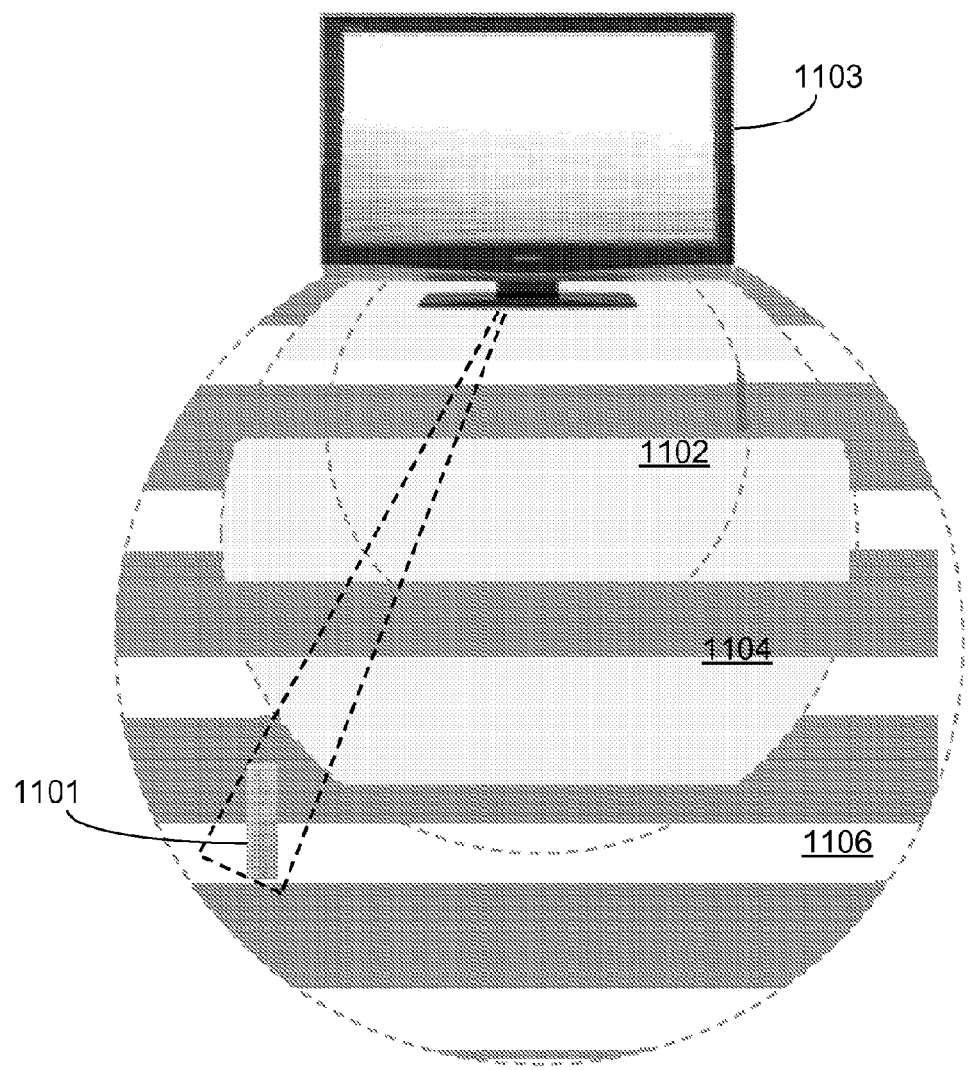
FIG. 11 illustrates a top plan view of the game console system, and showing proximity rings representing proximity zones for determining the proximity of a game controller to a game console unit.

Practically speaking, and illustrated in FIG. 11, the proximity of a controller 1101 with respect to the console 1103 will lie within one of several rings of depth 1102, 1104, 1106 corresponding to the available proximity resolution. As an alternative to calculating the round-trip time of flight, the channel bandwidth of the reflected signal may be monitored, with the result used as a parameter to provide an indication of proximity. The detection resolution will vary with controller proximity and relative location to the console. Pre-set mappings can be used to properly map controller location using stored data in a look-up-table for efficient determinations during operation.

Following the initialization procedure, game play may direct the console phased array antenna to lock onto the game controller position within a narrow field of view to monitor for changes in position. Depending on the game, the frequency of updates can be set differently. Updates on position can easily be done orders of magnitude faster than human movement. Consequently, many scans and/or position updates may occur during even the fastest of player movements.

Although the primary use of the millimeter-wave links described herein is to provide mobile game controller position detection and tracking, during updates, the wireless uplinks and downlinks established between the game console unit 102 and each controllers 104 and 106 may transmit post-initialization data between the devices unidirectionally or bidirectionally in a variety of ways. As noted above, to provide controller feedback effects for a player during gameplay, the console unit may generate various data such as vibration data for modulated transmission from the console to the controller. Transducer elements (not shown) within the controller convert the these signals from the receiver circuitry into sensible signals such as physical vibrations as sensory feedback for the player.

Conversely, a player may wish to depress one or more buttons on the controller keypad, or control a mini joystick to establish certain functionality with the console 102. Data generated at the controller in response to these user-initiated actions may be modulated onto reflected beams back to the console during operation.

While the above data transmission scheme employs a time-multiplexed approach to channelizing the system, dividing the available frequency spectrum into separate bands to create a frequency-multiplexed scheme is also a viable approach assuming an appropriately powered local oscillator is employed. Moreover, assigning codes to various channels such that a code-division multiplexed approach could be implemented is equally applicable.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A gaming system comprising:
   a game console unit including
      a processor,
      first transceiver circuitry coupled to the processor and including respective receiver and transmitter circuits;
      a first phased array antenna interface coupled to the first transceiver circuitry to transmit and receive millimeter-wave directional signals in response to the processor; and
   a first mobile game controller including
      a second phased array antenna interface to receive and redirect the directional signals back to the first phased array antenna interface; and
   wherein the processor generates proximity data based at least in part on a parameter associated with the directional signals, the proximity data representing the proximity of the first mobile game controller with respect to the game console unit.

2. The gaming system according to claim 1 wherein the parameter relates to a round trip time of flight of the directional signals.

3. The gaming system according to claim 1 wherein the parameter relates to detected available bandwidth associated with the directional signals.

4. The gaming system according to claim 1 wherein the directional signals include angle of arrival information, the processor operative to generate three-dimensional location data based at least in part on the proximity data and the angle of arrival information of the redirected directional signals.

5. The gaming system according to claim 4 and further including memory to store a signal parameter indicator value for each angle of arrival value.

6. The gaming system according to claim 1 wherein the processor comprises:
   a general purpose processor.

7. The gaming system according to claim 1 and further including a second mobile game controller, the game console unit further including a scheduler to manage communication between the game console unit and the first and second mobile game controllers.

8. The gaming system according to claim 1 wherein the first mobile game controller includes second transceiver circuitry to transmit and receive data to and from the game console unit.

9. The gaming system according to claim 1 wherein the first phased array antenna interface and the second phased array antenna interface cooperate to form a wireless link, the wireless link having a plurality of communication channels.

10. The gaming system according to claim 9 wherein the plurality of communication channels are divided in the time domain.

11. The gaming system according to claim 9 wherein the plurality of communication channels are divided in the frequency domain.

12. The gaming system according to claim 9 wherein the plurality of communication channels are divided in code space.

13. The gaming system according to claim 9 wherein the wireless link comprises an uplink to direct data from the first mobile game controller to the game console unit.

14. The gaming system according to claim 9 wherein the wireless link comprises a downlink to direct data from the game console unit to the first mobile game controller.

15. The gaming system according to claim 1 wherein the second phased array antenna interface includes a retro-directive array antenna.

16. The gaming system according to claim 15 wherein the retro-directive array antenna comprises:
   a plurality of antenna elements arranged in a two-dimensional array to receive a millimeter-wave signal of a predetermined carrier frequency;
   phase conjugation circuitry coupled to the plurality of antenna elements; and
   a local oscillator to provide a signal at twice the predetermined carrier frequency.

17. The gaming system according to claim 1 wherein the second phased array antenna interface includes modulation circuitry for data transmission along an uplink.

18. The gaming system according to claim 1 wherein the game console unit further includes:
   a display interface for coupling to a display device to graphically illustrate the position of an object based at least in part on the proximity data.

19. The gaming system according to claim 1 wherein the first phased array antenna and the second phased array antenna both comprise two-dimensional arrays of antenna elements.

20. The gaming system according to claim 1 wherein the transceiver circuitry operates within the range of frequencies between 30 GHz to 300 GHz.

21. The gaming system according to claim 8 wherein the second transceiver circuitry comprises:
   receiver circuitry forming a receiving end of a downlink, the receiver circuitry to receive modulated data in accordance with a constant amplitude form of modulation.

22. The gaming system according to claim 21 wherein the receiver circuitry comprises:
   an intermediate frequency mixer array to downconvert the received modulated data;
   a low-pass filter coupled to the intermediate frequency mixer array to demodulate the data; and
   slicing threshold comparator circuitry disposed at the output of the low-pass filter.

23. The gaming system according to claim 8 wherein the second transceiver circuitry comprises:
   transmitter circuitry forming a transmission end of an uplink, the transmitter circuitry to transmit data in accordance with a code-spreading method.

24. The gaming system according to claim 23 wherein the transmitter circuitry comprises:
   a linear modulator to generate modulated data from an input data stream;
   a spreading code generator to generate a chipping code for mixing with the modulated data; and
   a carrier frequency generator to generate a carrier wave signal of a predetermined frequency for mixing with the modulated data mixed with the chipping code.

25. The gaming system according to claim 1 wherein the first transceiver circuitry comprises:
   transmitter circuitry forming the transmission end of a downlink, the transmitter circuitry to transmit modulated data in accordance with a constant amplitude form of modulation.

26. The gaming system according to claim 25 wherein the transmitter circuitry comprises:
   a baseband processor to receive input data;
   a shift keying modulator coupled to the baseband processor to modulate the baseband processed data; and
   a mixer to upconvert the received modulated data to an RF signal.

27. The gaming system according to claim 1 wherein the first transceiver circuitry includes receiver circuitry forming a receiving end of an uplink, the receiver circuitry to receive data in accordance with a code-spreading method.

28. The gaming system according to claim 27 wherein the receiver circuitry comprises:
   a downconverter to downconvert the received RF signal;
   a spreading code generator to generate a chipping code for mixing with the downconverted data; and
   a filter to recover the data from the chipping coded signal.

* * * * *